Aug. 1, 1950     S. GREENING     2,517,304
TANK CARRIER AND POSITIONING DEVICE
Filed Feb. 28, 1949     2 Sheets-Sheet 1
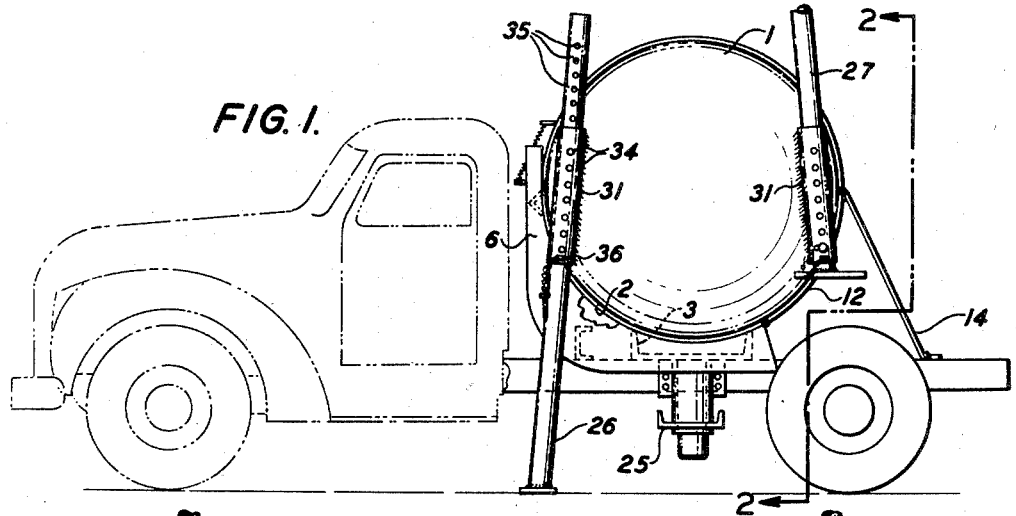
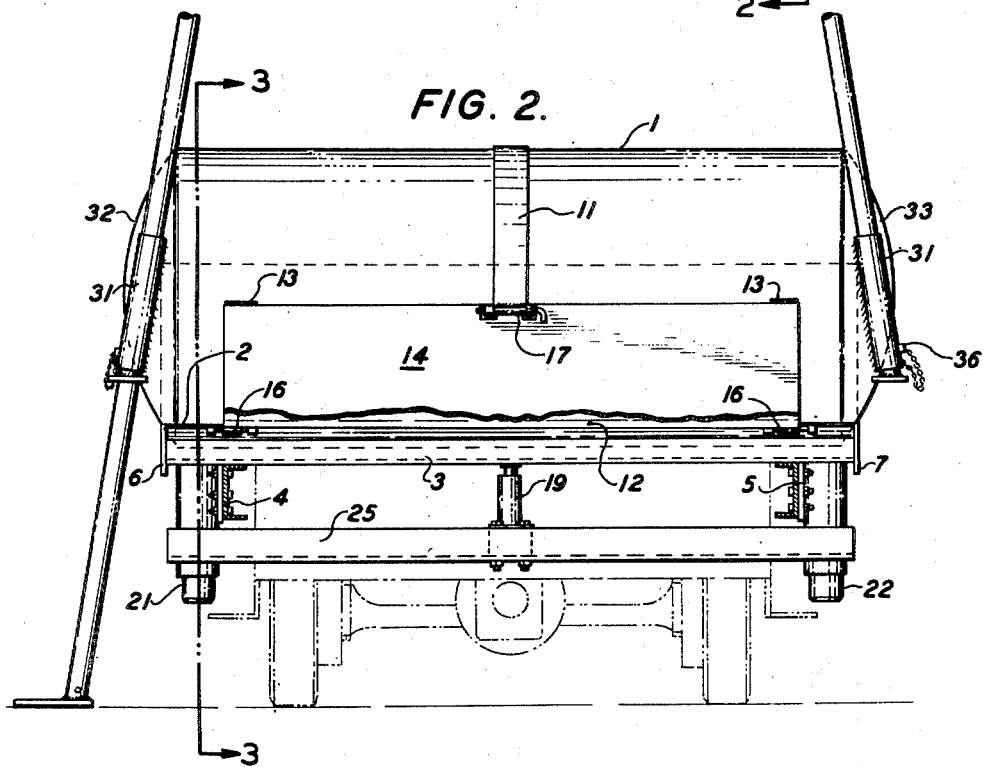
INVENTOR.
STANDLEE GREENING
BY
ATTORNEY

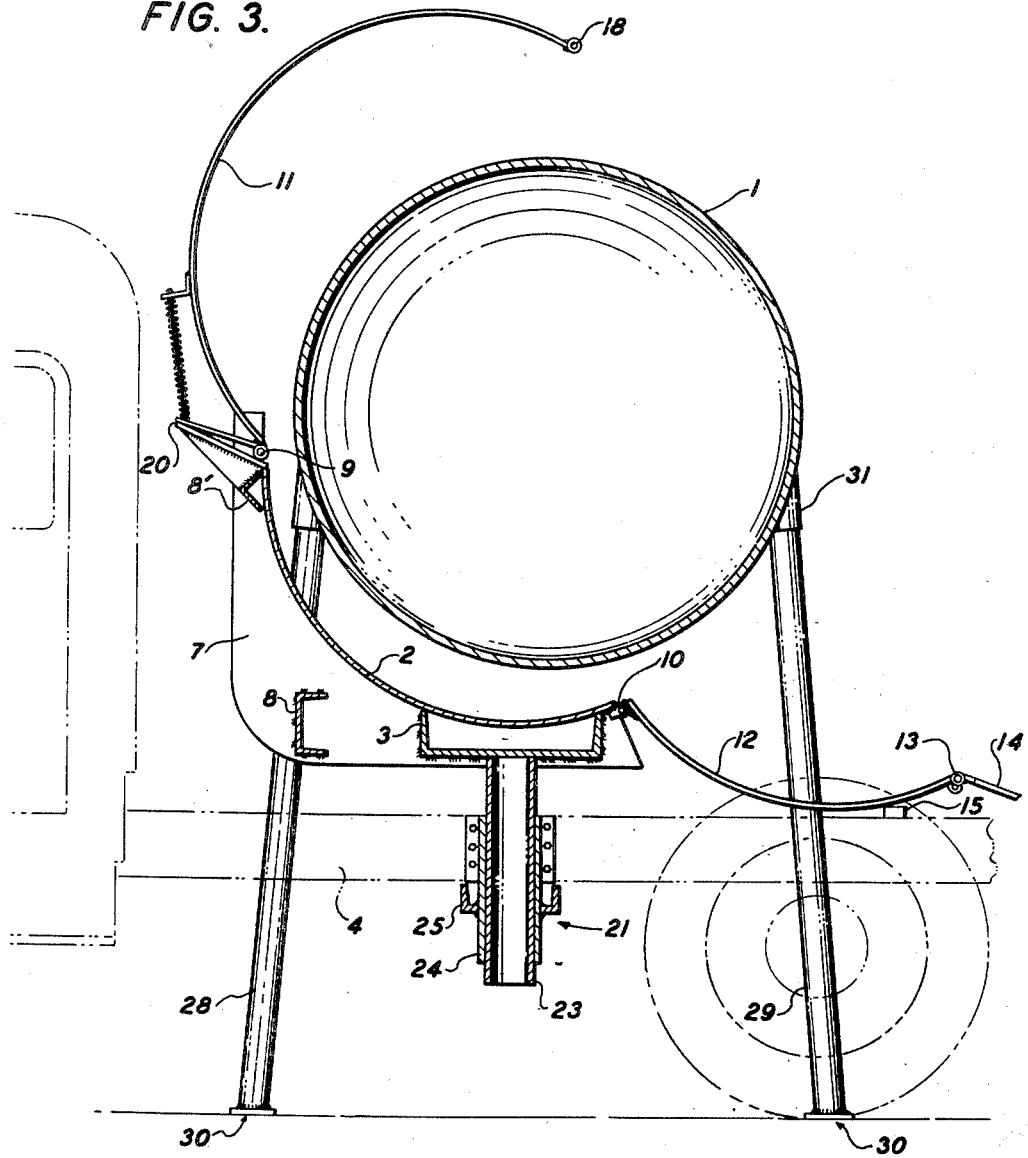

Patented Aug. 1, 1950

2,517,304

UNITED STATES PATENT OFFICE 2,517,304

TANK CARRIER AND POSITIONING DEVICE

Standlee Greening, Norwalk, Calif.

Application February 28, 1949, Serial No. 78,837

7 Claims. (Cl. 214—38)

This invention relates to means and ways of transporting loaded drums and tanks which contain fluids or semi-fluids, and which tanks are to be left supported above ground for dispensing of the fluids. Means are provided in association with the tank for supporting it above ground for the reason that it is not always convenient to locate proper means of supporting such tanks. This is particularly true when the tanks contain gasoline, oil or fertilizer for use in the field at various points thereof. A truck is employed for transporting the tanks and the body of the truck is specially designed for this purpose so that the tank or tanks can be left supported above ground directly from the truck body, thus making it entirely unnecessary for the tank or tanks to come into contact with the ground at any time. Such tanks are heavy and generally contain about 550 gallons of liquid, and their sizes run about 42 inches in diameter and about 96 inches in length. They are supported well above ground on adjustable legs, and the means is provided in combination with the truck body and its engine for mechanically raising and lowering the tank or tanks.

One of the principal objects of this invention is to present a new and novel tank and carrier combination wherein the tank is removable from the carrier and has self-supporting means when separated from the carrier; means being provided upon the carrier for raising and lowering the tank and also for securing the tank to the carrier when in transportation.

Another object is to provide a special carrier for transporting tanks and the like, the tanks having means for being self-supported above the carrying surface of the carrier; the carrier and tanks constituting a combination device which is simple and sturdy in construction, easy to control and manipulate, and a device which is economical to make and manufacture.

Other objects, advantages and features of this invention will appear from a perusal of the accompanying drawings, the subjoined detailed description, the preamble of these specifications, and the appended claims.

Applicant is now about to describe one of the preferable forms of his invention in order to teach one how to make and use the same, but it is to be understood that the drawings and description thereof are not to limit the invention in any sense whatsoever except as specifically limited by the appended claims.

In the drawings:

Figure 1 is a side elevational view of applicant's invention and it is shown as in combination with the body of a motor truck, the tank being seated in its cradle upon the truck bed and showing one of its legs in a supporting position upon the ground and the other leg raised; most of the truck, however, is shown in dotted lines, Figure 2 is a rear elevational view of that shown in Figure 1, and taken along line 2—2 of Fig. 1, Figure 3 is an enlarged side elevational view, parts in section, showing the tank raised and supported upon the ground, this view being taken substantially along line 3—3 of Fig. 2.

In this particular showing of the invention, the tank 1, in the Figure 1, is shown as resting upon a saddle or cradle plate 2 which is supported by a heavy gauge channel iron 3, the flanges thereof securely supporting the plate and/or tank; and the channel iron has its ends normally resting upon the chassis side channels 4 and 5 of the truck. The lateral ends of the plate are strengthened by the gussets 6 and 7 to which the plate ends are welded, and the gussets are braced by the cross-channel member 8 and their connection made by welding or by any other suitable means. The front and rear edges of the cradle plate 2 are curled to provide means at 9 and 10 for hinging the top latching band 11 and the rear snugger curved plate 12. The snugger plate is hinged at 13 to a movable bracer plate 14 and this bracer plate is held in proper position to make the snugger plate 12 engage the rearward portion of the tank. The bracer plate is held in position by the pair of blocks 15 and 16 which are securely fixed in any suitable manner upon their respective chassis channels 4 and 5, as shown. When the tank is raised and the truck is to pass beneath the tank, the bracer plate 14 is lowered by merely lifting its lower end above the blocks 15 and 16 so that the hinge portion 13 is lowered. An angle iron 8' is also provided in order to further brace the end gussets.

Any suitable latching means is provided at 17 for making a secured connection between the top central portion of the snugger plate 12 and the end 18 of the clamping band 11. Any suitable hydraulic jack, or electrical motor controlled jack, is employed for raising and lowering the tank, and such a jack is indicated at 19. When the hydraulic jack is used, fluid power is provided by the engine of the truck and is under the valved control of the truck operator. When an electric motor is used, the power is provided by the truck's battery or by a special battery should same be necessary or advisable. When the tank is about to be raised, the band end 18 is released so that its spring means 20 can raise the band 11 well above the tank so as not to interfere with its removal.

In order to raise the tank evenly and to proper position, the side guide means 21 and 22 are provided for the cradle channel 3. Each of the guides consists of a tube 23, the top of which is firmly secured, as by welding, to the web of the channel 3, and a sleeve 24 is securely bolted to its respective chassis channel, thus providing a suitable guide means for each end of the cradle channel 3. In order to stiffen the sleeves and provide a suitable beam to support the jack 19, the channel member 25 is provided and its ends welded to the sleeves 21 and 22.

The means for supporting the tank 1, when raised, consists of four legs 26, 27, 28 and 29 arranged as shown. Each leg is provided with a suitable wide web-like foot member 30 and a sleeve 31 which is securely welded, at the angles shown, to the tank heads 32 and 33. The sleeves have suitable angles so that the tank can be safely supported upon the ground when in use. Each sleeve has a plurality of holes 34 which are adapted to register with any one of a plurality of similar holes 35 in the top portion of their respective legs. A pin 36 is provided for each sleeve so that the legs can be positioned downwardly and held securely when they are supporting the tank, and also held upwardly out-of-the-way when not in such use. When the legs are in upward positions, their respective feet are turned inwardly toward the truck so as to avoid being struck while the truck is in transit.

It is, of course, understood that various changes and modifications may be made in the details of form, style, design, and construction of the whole or any part of the specifically described embodiment of this invention without departing from the spirit thereof; such changes and modifications being within the scope of the following claims.

I claim:

1. A mobile unit adapted to carry and transport a tank, the unit having a bed with a tank cradle thereon, means for raising and lowering the cradle, a tank positioned above the cradle and having leg means supporting it from the ground, the cradle comprising a curved plate which extends substantially across the unit and is adapted to support the lower portion of the tank, gussets at each end of the plate and curved to conform to the portion of the tank to be supported, a lifting channel comprising a portion of said means, jack means beneath and contacting the central portion of the channel, a guide tube fixed to each end of the channel and extending downwardly therefrom, and sleeve means for each tube fixed to a portion of the unit and adapted to guide their respective tubes vertically.

2. A mobile unit adapted to carry and transport a tank, the unit having a bed with a tank cradle thereon, means for raising and lowering the cradle, a tank positioned above the cradle and having leg means supporting it from the ground, the cradle comprising a curved plate reenforced at its ends, the curved plate having an arc to conform with the curvature of the tank, the means including a cross channel with its flanges upwardly directed and contacting the bottom surface of the curved plate, means hinged to the curved plate which is adapted to surround the tank and latch it in place on the curved plate, and hinged means extending rearwardly of the curved plate and attached thereto which is adapted to snugly engage the rearward lower surface of the tank, and means including long sleeves attached to the tank in spaced relationship, holes in the sleeves adapted to receive a pin, and said leg means having feet and one leg to a sleeve, the top ends of the legs having holes adapted to register with the holes of the sleeves so that the pins can hold the legs in desired positions for supporting the tank and for their carriage when the tank is in the cradle.

3. In a mobile unit adapted to carry and transport a tank, the unit having a chassis frame with a cross-member vertically movable with respect thereto and spaced from the ends thereof, a cradle plate supported by the cross-member adapted to receive the bottom portion of the tank to be transported, means for lifting and lowering the cross-member and its cradle plate, and ancillary means hinged to the cradle plate for fastening the tank thereto, the cradle plate supporting a cylinder type tank having a pair of spaced apart sleeves at the ends thereof, each sleeve having a leg extending therethrough adapted to contact the ground and support the tank, said sleeves having angular positions with respect to the surfaces of the tank so that the legs are flared outwardly for providing good stability for the tank.

4. In a truck and tank combination wherein the truck is adapted to deliver the tank to a use-site and leave it in a self-supported manner; the combination consisting of a truck with cradle means for raising the tank above the bed of the truck, the tank having spaced adjustable leg supporting means to position it above the ground ready for use, and the cradle means including a cross-channel with jack means to raise and lower it and equipped with spaced telescoping guide means for evenly moving the cross-channel.

5. In a tank carrier device for trucks and the like, a cross-member having guide means for vertical movement and power means for raising and lowering the member, a saddle attached to the cross-member and provided with means for securely accommodating a portion of a tank, end gussets spaced apart and fixed to their respective ends of the cross-member and the saddle, and means for enveloping the upper portions of a tank for securing it tightly to the saddle.

6. The device recited in claim 5 wherein the means enveloping the upper portions of a tank includes a snugger plate configurated to accommodate portions of a tank and a bracer plate hinged to the snugger plate and adapted to be blocked in an inclined position for holding it in contact with a tank.

7. The device recited in claim 5 wherein a cylindrical tank is supported upon the saddle, a plurality of spaced sleeves fixed to portions of the tank and inclined outwardly at their bottom ends, a supporting leg in each sleeve having feet of material area, and means for fixing the legs in their respective sleeves at various positions so that the tank can be held in a braced and raised position above the carrier device.

STANDLEE GREENING.

REFERENCES CITED

The following references are of record in the file of this patent:

UNITED STATES PATENTS

| Number | Name | Date |
|---|---|---|
| 1,425,965 | Hocke | Aug. 15, 1922 |
| 2,038,660 | Kretzschmar | Apr. 28, 1936 |
| 2,056,179 | Fitch | Oct. 6, 1936 |
| 2,166,134 | Fitch | July 18, 1939 |
| 2,169,500 | Reid | Aug. 15, 1939 |
| 2,233,005 | Garlinghouse | Feb. 25, 1941 |
| 2,296,611 | Green | Sept. 22, 1942 |
| 2,304,622 | Barrett | Dec. 8, 1942 |

FOREIGN PATENTS

| Number | Country | Date |
|---|---|---|
| 185,026 | Germany | Apr. 26, 1907 |